(12) United States Patent
Bender et al.

(10) Patent No.: US 7,703,135 B2
(45) Date of Patent: Apr. 20, 2010

(54) ACCESSING PROTECTED RESOURCES VIA MULTI-IDENTITY SECURITY ENVIRONMENTS

(75) Inventors: Ernest S. Bender, Saugerties, NY (US); Richard H. Guski, Red Hook, NY (US); Deborah F. Mapes, Port Ewen, NY (US); Bruce R. Wells, Stanfordville, NY (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/018,884

(22) Filed: Dec. 21, 2004

(65) Prior Publication Data
US 2006/0137021 A1 Jun. 22, 2006

(51) Int. Cl.
G06F 7/04 (2006.01)
G06F 21/06 (2006.01)
G06F 12/14 (2006.01)

(52) U.S. Cl. .............................. 726/21; 711/163; 707/9; 713/167

(58) Field of Classification Search .................. 726/27, 726/21
See application file for complete search history.

(56) References Cited

U.S. PATENT DOCUMENTS

| | | | |
|---|---|---|---|
| 5,321,841 A * | 6/1994 | East et al. ..................... | 718/107 |
| 5,699,518 A * | 12/1997 | Held et al. ................... | 709/229 |
| 5,727,145 A | 3/1998 | Nessett et al. ................ | 395/186 |
| 5,764,889 A | 6/1998 | Ault et al. .................... | 395/186 |
| 6,154,751 A * | 11/2000 | Ault et al. .................... | 707/201 |
| 6,377,994 B1 * | 4/2002 | Ault et al. .................... | 709/229 |
| 6,385,724 B1 * | 5/2002 | Beckman et al. ............. | 713/167 |
| 6,684,259 B1 * | 1/2004 | Discavage et al. ........... | 719/316 |
| 2001/0047485 A1 * | 11/2001 | Brown et al. ................. | 713/201 |
| 2003/0055809 A1 * | 3/2003 | Bhat .............................. | 707/1 |
| 2003/0158820 A1 | 8/2003 | Mathur et al. .................. | 705/67 |
| 2004/0015499 A1 | 1/2004 | Silverman et al. .............. | 707/9 |
| 2004/0024764 A1 | 2/2004 | Hsu et al. ....................... | 707/9 |
| 2005/0091655 A1 * | 4/2005 | Probert et al. ................ | 718/100 |

FOREIGN PATENT DOCUMENTS

JP 2003006165 A 1/2003

OTHER PUBLICATIONS

"Security Server RACF Security Administrator's Guide," IBM Corporation, SA22-7683-05, Sixth Edition, Sep. 2004.
"C++ Run-Time Library Reference," IBM Corporation, SA22-7821-06, Seventh Edition, Sep. 2004.
"Security Server RACROUTE Macro Reference," IBM Corporation, SA22-7692-06, Seventh Edition, Sep. 2004.
"Security Server (RACF) Introduction," IBM Corporation, GC28-1912-06, Seventh Edition, Sep. 1999.

* cited by examiner

Primary Examiner—Gilberto Barron, Jr.
Assistant Examiner—Cordelia Kane
(74) Attorney, Agent, or Firm—William A. Kinnaman, Jr., Esq.; Blanche E. Schiller, Esq.; Heslin Rothenberg Farley & Mesiti P.C.

(57) ABSTRACT

A multi-identity security environment is created for use in controlling access to resources. The multi-identity security environment enables one process that is spawned by another process to access resources security accessible to the one process, as well as resources security accessible to the another process. The multi-identity security environment includes an identity of the one process and an identity of the another process.

30 Claims, 6 Drawing Sheets fig. 1 fig. 2 fig. 3 fig. 4 fig. 5 fig. 6

# ACCESSING PROTECTED RESOURCES VIA MULTI-IDENTITY SECURITY ENVIRONMENTS

TECHNICAL FIELD

This invention relates, in general, to controlling access to resources, and in particular, to creating multi-identity security environments to facilitate access to protected resources.

BACKGROUND OF THE INVENTION

Controlling access to protected resources is of paramount importance in many computing environments. Inadvertent or unauthorized access to a protected resource can corrupt the resource and have other far reaching detrimental effects to the environment. Access is controlled by limiting for a given resource those processes authorized to access the resource. For example, for a particular resource, access authorization is provided to a limited set of processes and processes external to the limited set are unauthorized to access that particular resource.

At times, however, a given process needs access to a resource that it is authorized to access, as well as to a resource that it is unauthorized to access. For example, in a client/server system, a client may request a service of the server and to fulfill that service the server is to have access to one or more resources to which it is authorized, as well as to one or more resources accessible to the client, but not to the server.

Previously, to address this situation, the server created a new client process and under the auspices of the client's identity accessed the desired resources. However, this may not be sufficient, since the new client may also need access to resources of the server.

In order to access the server resources, the identity of the client has to be switched back to the server. That is, the identity of the client is switched back and forth between the identity of the client and the identity of the server depending on which resource is to be accessed at any particular point in time in order to service the client's request.

The switching of identities is disadvantageous, however. For example, it adds complexity to the application code and compromises security. Therefore, a further need exists for a capability that facilitates access to protected resources. As one example, a need exists for a capability that eliminates the switching of identities.

SUMMARY OF THE INVENTION

The shortcomings of the prior art are overcome and additional advantages are provided through the provision of a method of managing identities of processes of a computing environment. The method includes, for instance, initiating by one process in one address space creation of another process in another address space; and providing a multi-identity security environment for the another process, the multi-identity security environment including an identity of the another process and an identity of the one process.

In a further aspect of the present invention, a method of facilitating access to resources of a computing environment is provided. The method includes, for instance, having one process and another process, wherein a relationship exists between the one process and the another process; and providing a multi-security environment for a process of the one process and the another process, the multi-security environment including a security environment for the one process and a security environment for the another process, the multi-security environment usable in accessing a set of resources by the process, the set of resources comprising a union of one or more resources accessible via the security environment of the one process and one or more resources accessible via the security environment of the another process.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, controlled access to protected resources is facilitated by creating a multi-identity security environment for a process that enables that process to access resources that it otherwise would not be able to access. The multi-identity security environment includes, in this example, two identities, one identity that enables the process to access one set of resources and another identity that allows the process to access another set of resources that it would not be able to access via the first identity.

The multi-identity security environment can be used in many computing environments, including, for instance, a client/server environment. In a client/server environment, the multi-identity security environment includes an identity of a client process (also referred to as the client) and an identity of a server process (also referred to as the server) that initiated the client process. The multi-identity security environment enables the client process to have access to one or more resources accessible by the client process and one or more resources accessible by the server process. Log records are optionally maintained identifying which resources the client process accessed.

Figure 1:
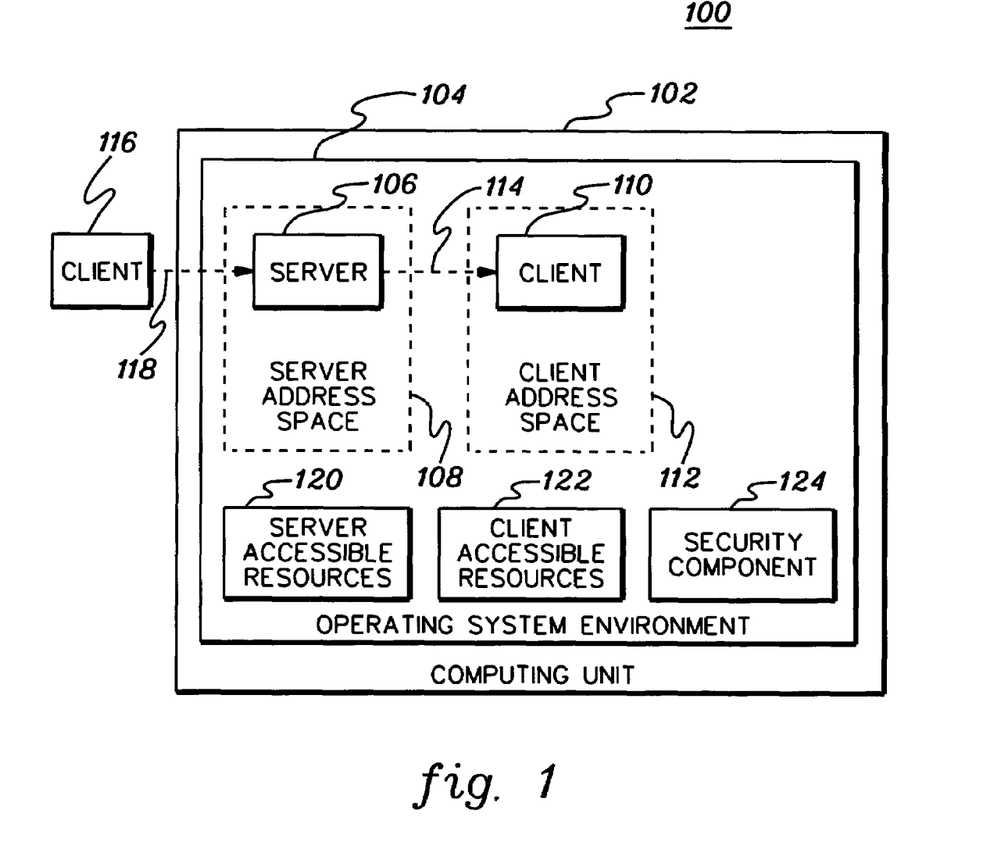
FIG. 1 depicts one example of a computing environment incorporating and using one or more aspects of the present invention.

One embodiment of a client/server environment 100 incorporating and using one or more aspects of the present invention is described with reference to FIG. 1. As one example, client/server environment 100 includes at least one computing unit 102, such as an eServer zSeries z990 system, which executes an operating system 104, an example of which is the z/OS operating system, offered by International Business Machines Corporation, Armonk, N.Y.

Operating under the control of the operating system is at least one server 106 running in a server address space 108 and at least one client 110 running in a client address space 112. Server 106 and client 110 are coupled to one another via a communications path 114.

In this particular example, server 106 creates client 110 to service a request received from a client 116, as described further below. Client 116 is coupled to server 106 via a communications path 118, and client 116 can be executing within computing unit 102 or in a separate unit.

Server 106 and client 110 each have access to a respective set of resources 120, 122. Resources 120 are accessible by server 106 (i.e., security accessible), but inaccessible by client 110. That is, resources 120 are not accessible via a client identity security environment. Likewise, resources 122 are accessible by client 110, but inaccessible to server 106. At times, it is said that resources 120 are owned by server 106 and resources 122 are owned by client 110. This means that the identity security environment associated with server 106 has authorization rights to resources 120 and the identity security environment associated with client 110 has authorization rights to resources 122. Control of the resources is managed by a security component 124, an example of which is the Resource Access Control Facility (RACF), offered by International Business Machines Corporation. (RACF, z990, z/OS, IBM, as well as other names used herein are trademarks or registered trademarks of International Business Machines Corporation, Armonk, N.Y.)

As mentioned above, client 116 requests a service from server 106. In order to perform the requested service, the server requires access to one or more resources 122 that are owned (i.e., security accessible) by the client. Thus, the server starts a new client process 110 in which the server function will execute. However, during execution of this client process, resources that are owned by the server (e.g., resources 120) may also need to be accessed. Thus, in accordance with an aspect of the present invention, a capability is provided in which the client process can access resources accessible to the client, as well as resources accessible to the server.

In one example, this capability includes creating a multi-identity security environment in which the client process has access to one or more resources accessible by the client, as well as to one or more resources accessible by the server. In order to enable this capability, various initialization procedures are invoked, as described below with reference to FIGS. 2 and 3.

Figure 2:
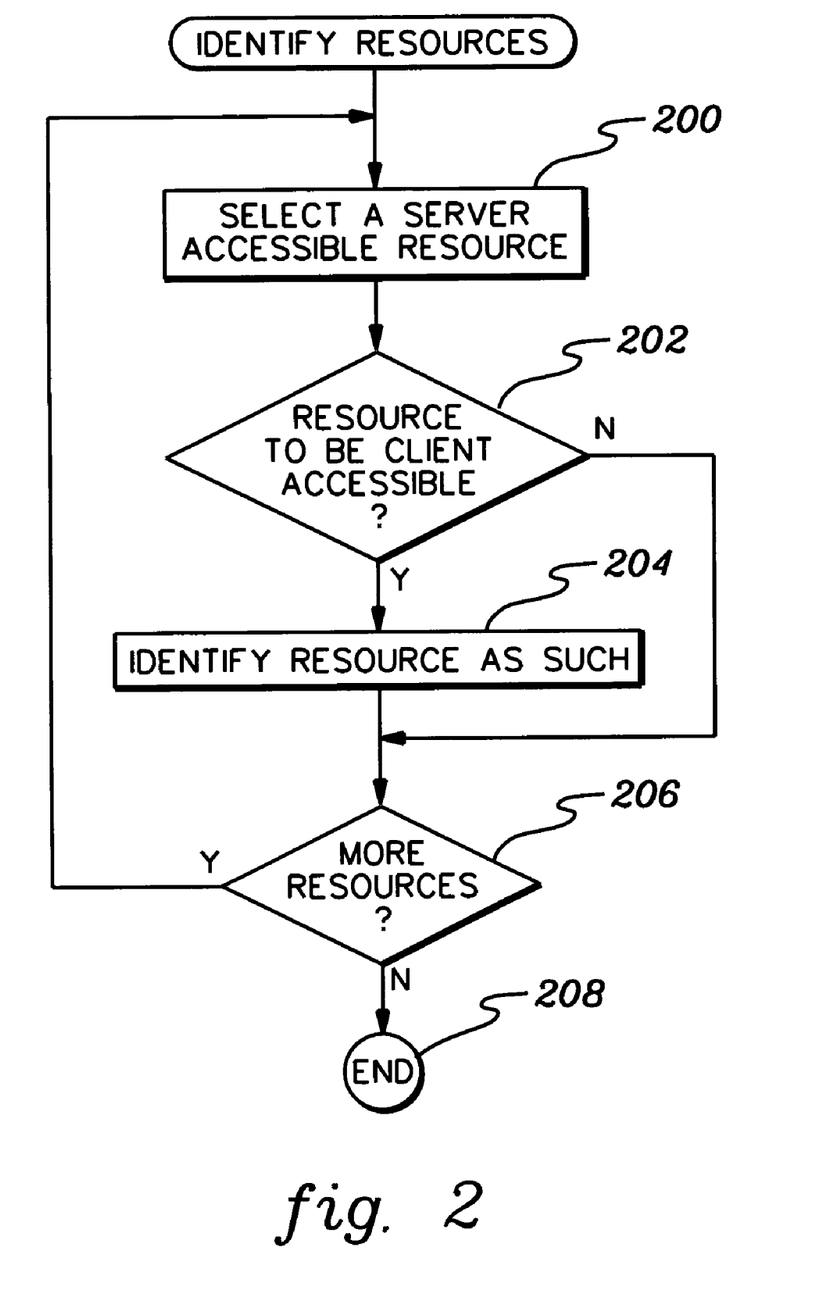
FIG. 2 depicts one embodiment of the logic associated with identifying server accessible resources that are to be designated as client accessible, in accordance with an aspect of the present invention.

Referring initially to FIG. 2, in order to make one or more resources that are accessible to a server also accessible to a client, the server accessible resources are specifically identified by administrative action as client accessible. This prevents the inadvertent exposure of other server accessible resources to end user clients, when such resources are not so intended.

One embodiment of the logic associated with indicating that server accessible resources are to also be accessible to one or more client processes is described with reference to FIG. 2. A server accessible resource is selected, STEP 200, and a determination is made as to whether that resource is to be client accessible, INQUIRY 202. If the resource is to be client accessible, then the resource is identified as such by, for instance, an administrative action, STEP 204. Server accessible resources that are to be made client accessible are, in one example, referred to as delegated resources, and in a RACF environment, the administrative action for designating a resource as delegated includes, the placing of a string "RACF-DELEGATED" in the APPLDATA field of the RACF profile protecting the resource. One example of the APPLDATA field of RACF is described in an IBM publication entitled, "OS/390 Security Server (RACF) Introduction," GC28-1912-06, 7$^{th}$ edition, September 1999, and/or in an IBM publication entitled, "z/OS V1R6.0 Security Server RACF Security Administrator's Guide," SA22-7683-05, September 2004, each of which is hereby incorporated herein by reference in its entirety.

Thereafter, or if the resource is not to be delegated as client accessible, a determination is made as to whether there are more resources to be processed, INQUIRY 206. Should there be more resources to be processed, then processing continues with STEP 200. Otherwise, processing is complete, STEP 208.

Figure 3:
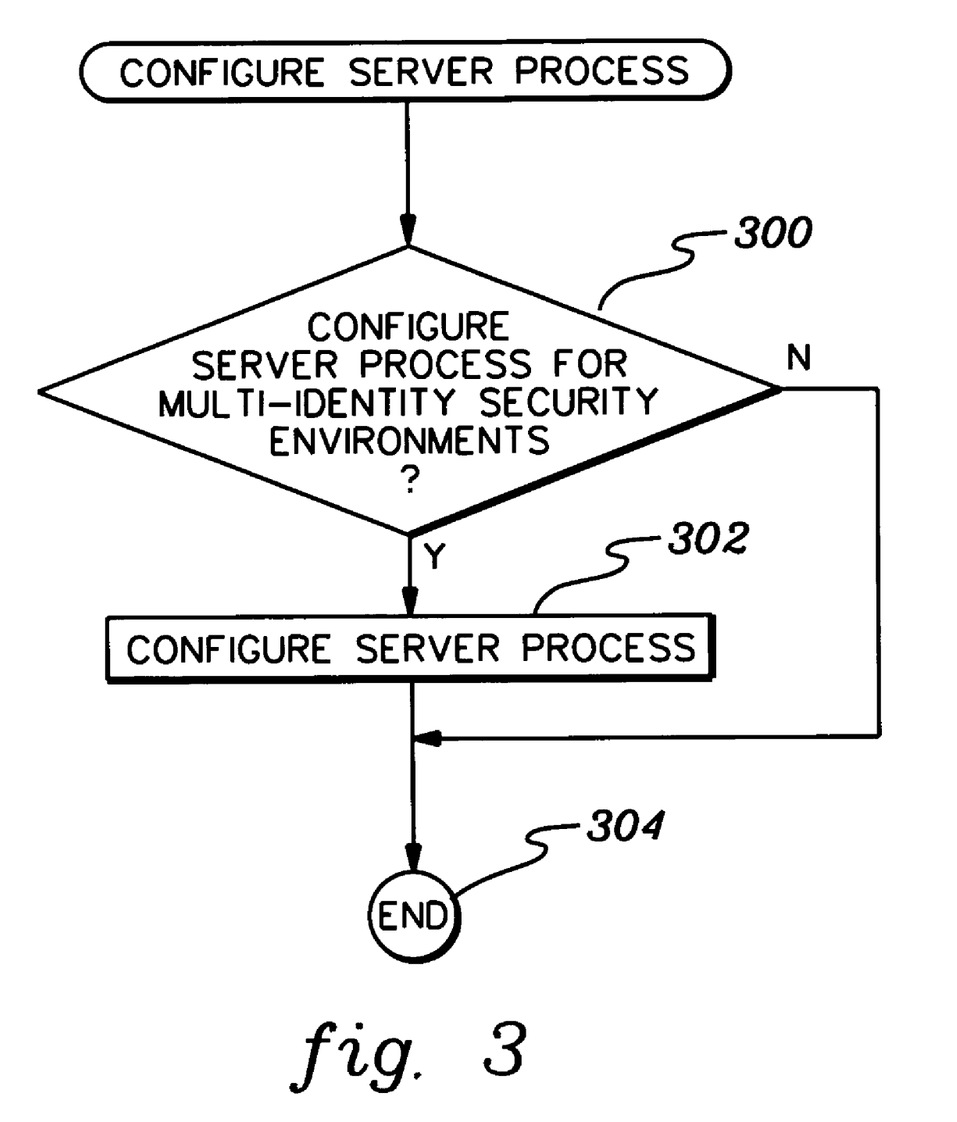
FIG. 3 depicts one embodiment of the logic associated with configuring a server process to enable the server process to initiate creation of multi-identity security environments, in accordance with an aspect of the present invention.

In addition to specifying server resources that are delegatable, another initialization procedure includes configuring the server to enable the server to be able to initiate (i.e., implicitly request) creation of multi-identity security environments. For example, the server is configured so that when the server requests creation of the client, creation of a multi-identity security environment is initiated.

One embodiment of this configuration is described with reference to FIG. 3. Initially, a determination is made as to whether the server process is to be configured to be able to initiate creation of multi-identity security environments, INQUIRY 300. Should the server process, in response to creating a client process, be allowed to have a multi-identity security environment be created, then the server process is so configured, STEP 302. In one example, this behavior of the server process is administratively directed by using an environment variable, as described below, without the necessity of changing the programming behavior of the server process (i.e., without recoding). This provides cost savings by bypassing the need to change the server code, when a server function is ported to execute on an operating system (e.g., z/OS), which has a high security multi-identity security environment from another operating system platform that has less sophisticated security capabilities.

Subsequent to configuring the server or if the server is not to be configured to initiate creation of multi-identity security environments, initialization is complete, STEP 304.

Assuming one or more resources are delegated and a server process is configured for multi-identity security environments, multi-identity security environments may be created and used, in accordance with one or more aspects of the present invention. One embodiment of the logic associated with creating a multi-identity security environment is described with reference to FIG. 4.

Figure 4:
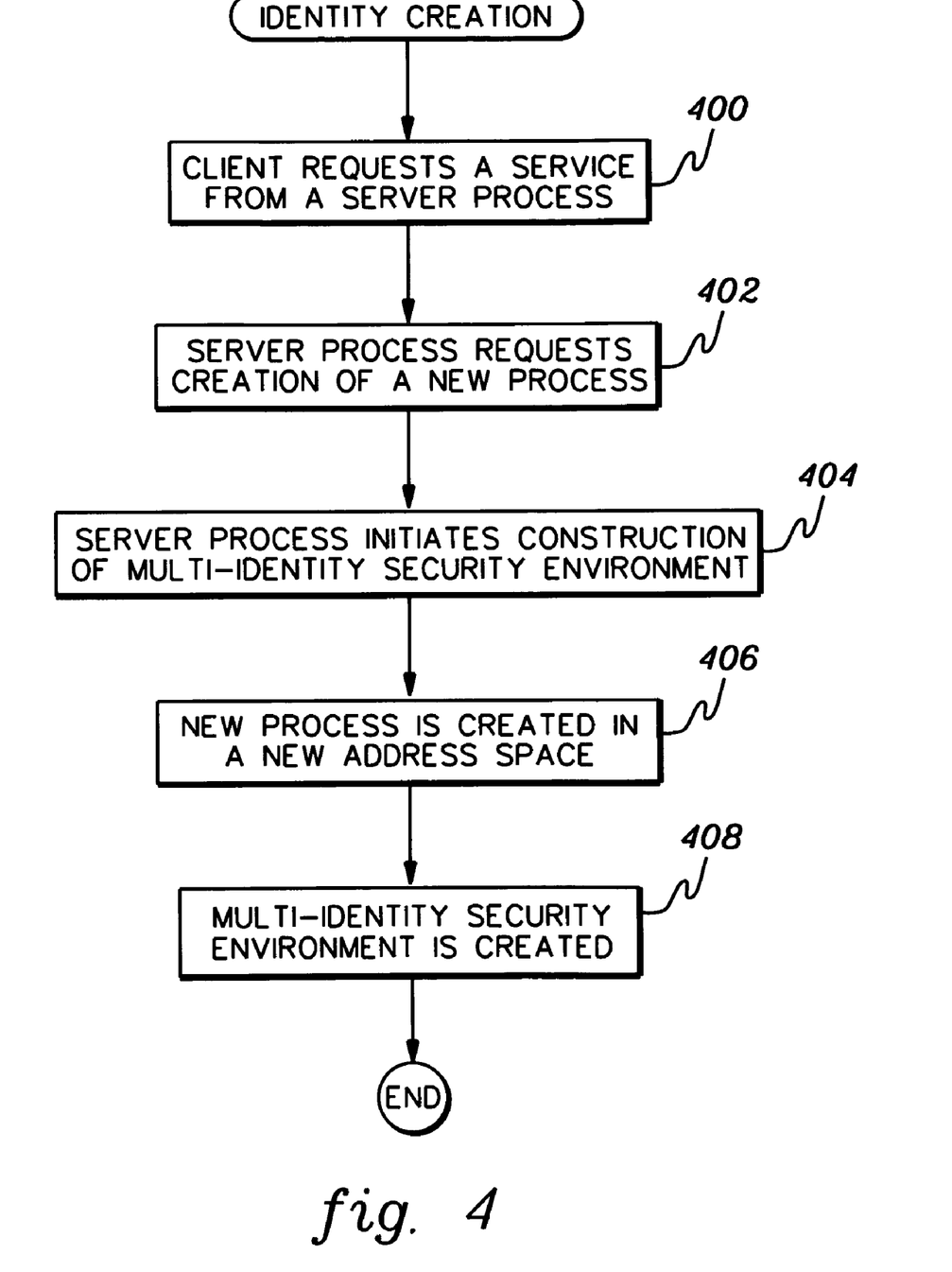
FIG. 4 depicts one embodiment of the logic associated with creating a multi-identity security environment, in accordance with an aspect of the present invention.

Initially, a client requests a service from a server process, STEP 400. As one example, a client owned by a user and identified by the user's id requests a service of a server process, which is identified by the servers' user id in the form of an identity security environment. The service requires access to resources that are owned by the client (i.e., client security accessible), and thus, the server process requests creation of a new client process in which the server process will execute, STEP 402. In one example, this request is forwarded to a component of the operating system controlling execution of the server process.

The new client process, however, may also need access to server accessible resources, and thus, instead of creating an identity security environment of the client, the server, in accordance with an aspect of the present invention, initiates construction of a multi-identity security environment for the client that includes within it, for instance, the identity security environment of the server making the client request, STEP 404. Therefore, the multi-identity security environment includes the identity of the client, as well as the identity of the server that created the client. This enables the identity security environment to carry with it a history of how the process was created, which was by an authorized action of the server, and that the created process, even though it has the identity of the client, can be trusted to behave as if it were the server.

In response to the request to create the client process, the new client process is created in a new client address space, STEP 406, and the multi-identity security environment is created by the controlling operating system, STEP 408.

The creation of the multi-identity security environment enables the client process to access client accessible resources, as well as delegated server accessible resources. A security component of the operating system makes use of the multi-identity security environment in resource access control checking decisions. This can be performed without having the process switch back and forth between different identities. One embodiment of the logic associated with using a multi-identity security environment in access control is described with reference to FIG. 5. In one embodiment, the security checking of this logic is performed via a security component of the operating system.

Figure 5:
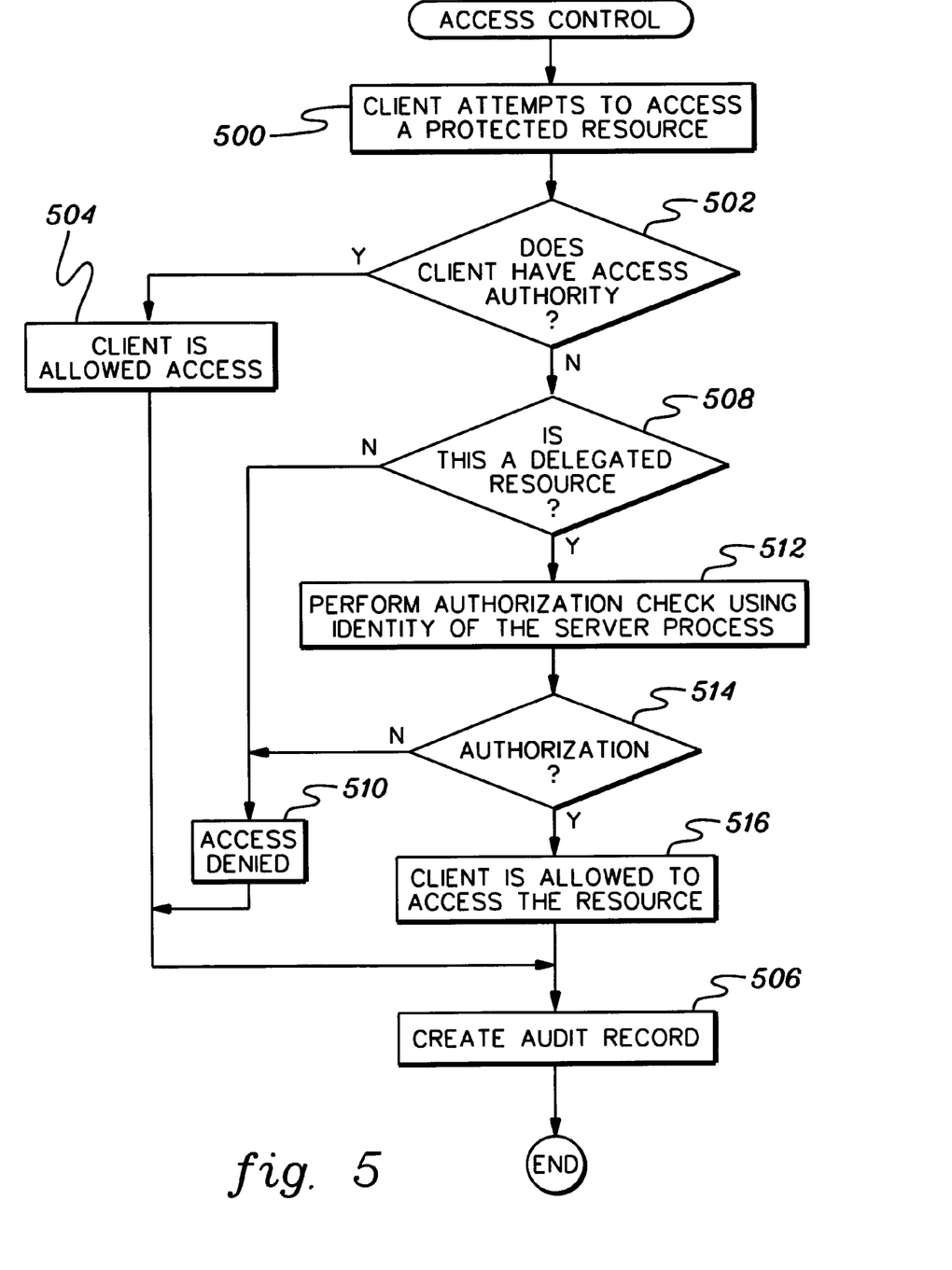
FIG. 5 depicts one embodiment of the logic associated with using a multi-identity security environment to control access by a client to a protected resource, in accordance with an aspect of the present invention.

Initially, a client attempts to access a protected resource, STEP 500. A determination is made as to whether the client has access authority, INQUIRY 502. This determination is performed by, for instance, the security component checking the security profile created for the resource. If the client identifier is on an access list for the resource, then the client is authorized to access the resource, STEP 504, and optionally, an audit record is created detailing the event, STEP 506. However, if the client is not on the access list, then a further determination is made as to whether this is a delegated resource, INQUIRY 508. As one example, this determination is made by checking an indicator in the resource profile. If the resource is not delegated, then access is denied, STEP 510, and again, optionally, an audit record is created, STEP 506.

On the other hand, if this resource is a delegated resource, INQUIRY 508, then the authorization check is performed once again using the identity of the server process, STEP 512. For example, an inquiry is made as to whether the server's identity is on the access list for the resource. Should the server's identity not be on the list, and thus, unauthorized, INQUIRY 514, access is denied, STEP 510, and optionally, an audit record is created, STEP 506. For instance, the audit record logs the overall failure (both client and server do not have access to delegated resource) as an atomic operation, where both the server and client are identified in the audit record.

However, if the server's identity is authorized, then the client is permitted to access the resource, STEP 516. Further, optionally, in one embodiment, an audit record is created detailing the events, STEP 506. For instance, the audit record indicates that the client was allowed to access server accessible resources, since the client process was established through an action of the server that was authorized to access those resources.

Described in detail above is a capability for creating a multi-identity security environment for use in controlling access to protected resources. Multi-identity security environments can be used in many types of computing environments to control access to resources. In one particular example, a multi-identity security environment is used in a z/OS operating environment executing Unix System Services, as described with reference to FIG. 6.

Figure 6:
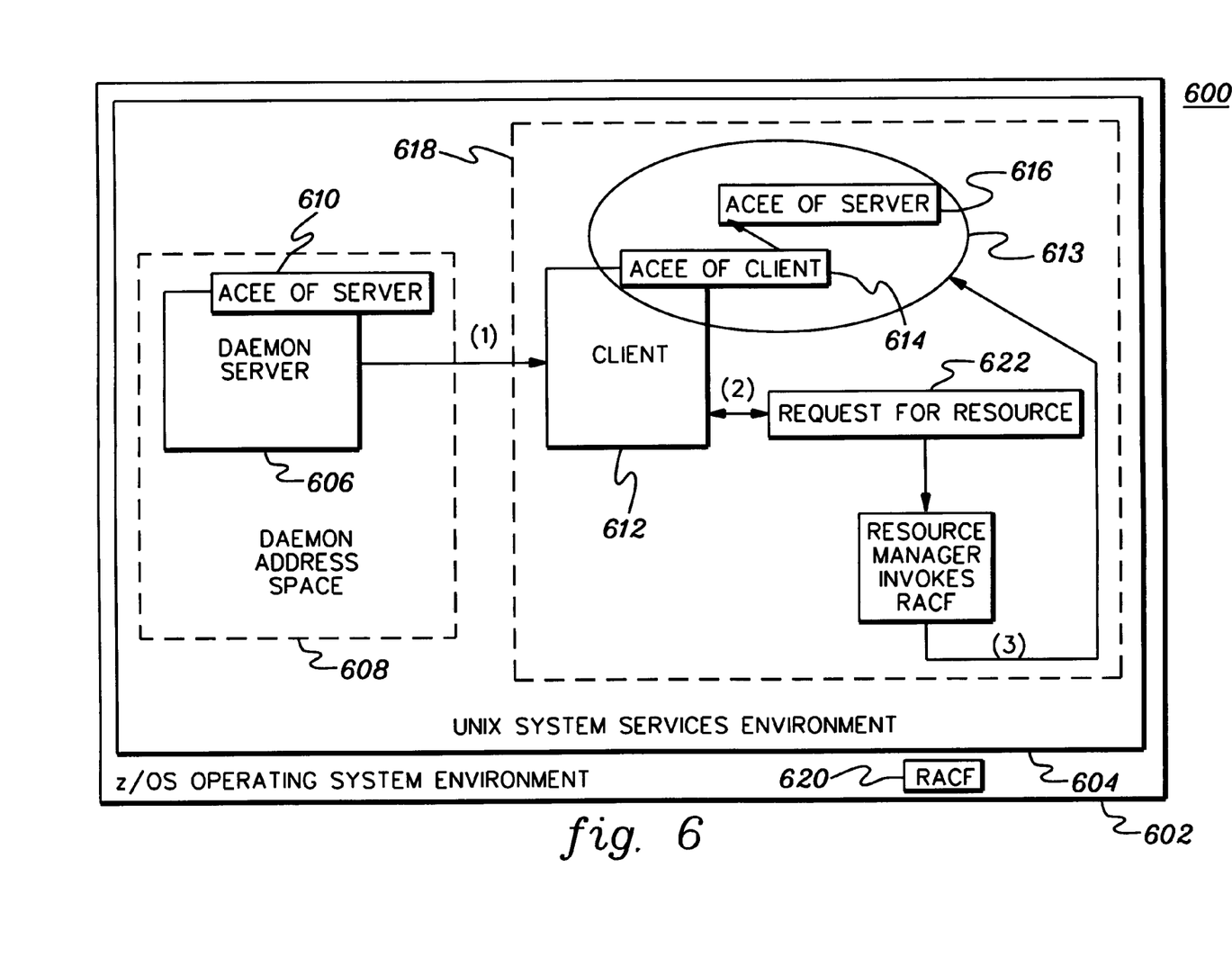
FIG. 6 depicts one particular example in which the multi-identity security environment capability of the present invention is employed.

Referring to FIG. 6, a computing unit 600, such as an IBM eServer zSeries machine (e.g., z990), executes the z/OS operating system 602 and Unix System Services 604, which is a component of the z/OS operating system. A daemon process (i.e., server) 606 operates in a daemon address space 608 under the control of Unix System Services. The daemon has associated therewith a security environment (e.g., an identity security environment), which is referred to herein as an accessor environment element (ACEE) 610.

As one example, the daemon process is a File Transfer Protocol (FTP), which is invoked by a client (not shown) to transfer data of the client. To perform this service, the daemon needs access to one or more resources (e.g., storage) accessible to the client to transfer the data. Thus, daemon 608 makes a request to Unix System Services to create a new client process 612 (refer to #1 in FIG. 6). For example, daemon 606 executes a Unix fork to create the new process. One example of the fork function is described in an IBM publication entitled, "z/OS C/C++ Run-Time Library Reference," SA22-7821-06, September 2004, which is hereby incorporated herein by reference in its entirety.

Further, by its configuration, the daemon server initiates creation of a multi-identity security environment 613 for new client 612. This multi-identity security environment (also referred to as a nested ACEE) is to include an identity environment (e.g., ACEE) 614 of the client, as well as an identity environment (e.g., imbedded ACEE) 616 of the daemon server that is making the creation request. Further details regarding the creation of the nested ACEE are described below.

The Unix System Services environment creates the new process within a new client address space 618, and invokes an operating system security component (e.g., RACF) 620 to build the nested ACEE for the client including the imbedded ACEE of the daemon. For example, Unix System Services is programmed to look for a particular Unix environment variable of the daemon, such as, for instance, _BPXK_DAEMON_ATTACH=YES, and to behave accordingly, when it is present. The Unix environment variable is a way for administrative personnel to influence by configuration certain behaviors of a Unix program or to the Unix System Services that are providing the processing environment for the program or daemon. Therefore, in one example, if the configuration parameters of the daemon include the specified environment variable, they indicate to Unix System Services that when this particular daemon requests that a new process (and associated z/OS address space) be created for a specified client user, the identity environment created for that process is to be a nested ACEE that reflects the identity of the client user and that imbedded within it is an ACEE reflecting the identity of the daemon.

To create the multi-identity security environment, Unix System Services invokes RACF with a RACF function, called RACROUTE REQUEST=VERIFY with a NESTED=YES keyword. RACROUTE REQUEST=VERIFY is an interface used by an authorized function, such as a daemon, to request creation of an ACEE. RACROUTE is described in an IBM publication entitled, "OS/390 Security Server (RACF) Introduction," GC28-1912-06, 7$^{th}$ edition, September 1999, and/ or in "z/OS V1R6.0 Security Server RACROUTE Macro Reference," SA22-7692-06, September 2004, each of which is hereby incorporated herein by reference in its entirety.

By invoking the RACROUTE function, a control block, referred to as an ACEE is built, which includes information describing the user. It is anchored within the address space in a common location where RACF and other services can locate it.

Thereafter, the process running under the identity of the client requests access 622 to a resource (e.g., a cryptographic key) that is security accessible to the daemon (refer to #2 in FIG. 6). The security component uses the multi-identity security environment in an access control check to provide access to the resource by the client (refer to #3 of FIG. 6). For example, the nested ACEE influences the behavior of the operating system resource access authorization checking and auditing functions, which in this example are implemented in RACF. When a client attempts to access a protected resource that is controlled by the operating system (or one of its components) and the client alone has insufficient authority to access the resource, for selected resources, the nested ACEE causes the security component (e.g., RACF) to redrive the authorization check using the identity of the daemon. If the daemon has sufficient authority to the selected resource, the process, having the identity of the client, is allowed to access the resource. When this series of events occurs, the operating system security service creates auditing log records that indicate that the client accessed the resource because the client's process was executing with an ACEE security environment that included a nested ACEE reflecting the identity of the daemon which had sufficient authority to access the resource.

Described in detail above is a capability for creating a multi-identity security environment to be used, for instance, in accessing protected resources. For example, a logical security service is provided for associating a client identity with the process (e.g., daemon or server) who spawned it by nesting the process' identity within a single security environment created for the client at the request of the process. Although in the examples herein, the multi-identity security environment is used to access resources, it may be used for other purposes, including, but not limited to, auditing, etc.

In one embodiment, the process that the server uses, either existing or specifically created, is assigned a new identity that includes an association of multiple identities that may be used during any access control checking events, to access resources owned by those associated identities, that may occur during the processing of a transaction request.

Access control checking events that occur during the processing of the transaction request and which involve the use of the described multiple associated identities are treated as atomic events for auditing and other purposes, and not as multiple separate access control checking events. In accordance with an aspect of the present invention, an option is provided for protected resources to be specifically defined as to be eligible for access via the identities.

Advantageously, the history of how the client user process is started is retained, and both the identity of the client user and the identity of the server are available for any access control checking events that result from the processing of the request, which can now access specifically defined resources owned by the server, as well as resources owned by the client. Auditing can also correctly reflect the situation and its history. The auditing reflects the access control event, in which resources owned by multiple identities are legitimately accessed by a single process, as a single event.

Advantageously, one or more aspects of the present invention can be implemented without updating ported product code.

Although various embodiments are described herein, these embodiments are only examples. Many other embodiments can be used and/or benefit from one or more aspects of the present invention. For example, although a particular environment is described, other environments can incorporate and use one or more aspects of the present invention. As examples, systems other than z990 systems, operating systems other than z/OS and components other than USS may be employed. For instance, a system that emulates z/OS may be used or an entirely different operating system may be employed. Many other variations also exist. Additionally, environments other than client/server environments can benefit from one or more aspects of the present invention. Further, although RACF is described herein, other security components including, but not limited to, CA-ACF2 and CA-TopSecret may be used. CA-ACF2 and CA-TopSecret are software products that are similar in function to RACF, and are offered by Computer Associates International, Inc., One Computer Associates Plaza, Islandia, N.Y. 11749.

Moreover, although in the above example, the server and client run in their own respective addresses spaces, in another embodiment, they can run in the same address space. As one example, a fork function is not needed. Further, the server and client can be operating in the same computing unit or differing units. Many other variations can exist without departing from the spirit of the present invention.

As yet further examples, the use of FTP as the daemon and cryptographic keys as a daemon resource are only examples. Other daemons or servers that require access to another process' resources can benefit from one or more aspects of the present invention. Additionally, the server accessible resources and the client accessible resources can be many different resources.

Moreover, although in the example above, the multi-identity security environment includes two identities, in other examples, the multi-identity security environment includes more than two identities. Further, the multi-identity security environment is only one example of a security environment. Multi-security environments including security information other than identities may be used. Yet further, the multi-security environments, including multi-identity security environments, can include other information, such as access permissions, access rules, attributes, etc.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing identities of processes of a computing environment, said method comprising:
   initiating by a server process in a server address space creation of a client process in a client address space to service a request from a client, wherein the client process executes the server process;
   providing a multi-identity security environment for the client process, the multi-identity security environment is a nested security environment that includes a user identity of the client process and a user identity of the server process;
   using the multi-identity security environment to determine whether the client has authority to access a protected resource, said using comprising:
      determining whether a user identity is on an access list for the protected resource, wherein the user identity is the user identity of the client process or the user identity of the server process, and wherein another user identity is the other of the user identity of the client process and the user identity of the server process;
      granting the client access to the protected resource via the user identity, in response to the determining indicating the user identity is on the access list;
      deciding, in response to the user identity not being on the access list, whether the another user identity is on the access list;
      granting the client access to the protected resource via the another user identity, in response to the deciding indicating the another user identity is on the access list; and
      providing an audit record, in response to access being granted, that indicates which user identity of the multi-identity security environment for the client process provided access, wherein the audit record indicates whether access was granted via the user identity of the client process or whether access was granted via the user identity of the server process.

2. The method of claim 1, further comprising identifying one or more resources accessible by the server process that are to be accessible by the client process.

3. The method of claim 1, wherein the providing of the multi-identity security environment comprises constructing, by a component of an operating system of the computing environment, the multi-identity security environment.

4. The method of claim 1, wherein the multi-identity security environment is provided in response to the server process initiating creation of the client process.

5. The method of claim 1, further comprising initiating by the server process the providing of the multi-identity security environment, in response to initiating creation of the client process.

6. The method of claim 5, further comprising configuring the server process to enable the server process to initiate the providing of the multi-identity security environment.

7. The method of claim 6, wherein the configuring comprises using an environment variable to configure, wherein recoding of the server process is unnecessary.

8. The method of claim 1, wherein the multi-identity security environment is used by the client process to access a resource accessible to the server process but not accessible to the client process using the user identity of the server process.

9. The method of claim 8, wherein the client process uses the user identity in the multi-identity security environment of the client process to access a resource accessible to the client process but not accessible to the server process.

10. The method of claim 8, wherein the audit record further specifies the particular events of the access including an indication that the client was allowed to access server accessible resources, since the client process was established through an action of the server process that was authorized to access the resources.

11. A computer system for managing identities of processes of a computing environment, the computer system comprising:
    a memory; and
    a processor in communications with the memory, wherein the computer system is capable of performing a method, said method comprising:
       initiating by a server process in a server address space creation of a client process in a client address space to service a request from a client, wherein the client process executes the server process;
       providing a multi-identity security environment for the client process, the multi-identity security environment is a nested security environment that includes a user identity of the client process and a user identity of the server process;
       using the multi-identity security environment to determine whether the client has authority to access a protected resource, said using comprising:
          determining whether a user identity is on an access list for the protected resource, wherein the user identity is the user identity of the client process or the user identity of the server process, and wherein another user identity is the other of the user identity of the client process and the user identity of the server process;
          granting the client access to the protected resource via the user identity, in response to the determining indicating the user identity is on the access list;
          deciding, in response to the user identity not being on the access list, whether the another user identity is on the access list;
          granting the client access to the protected resource via the another user identity, in response to the deciding indicating the another user identity is on the access list; and
          providing an audit record, in response to access being granted, that indicates which user identity of the multi-identity security environment for the client process provided access, wherein the audit record indicates whether access was granted via the user identity of the client process or whether access was granted via the user identity of the server process.

12. The computer system of claim 11, wherein the method further comprises identifying one or more resources accessible by the server process that are to be accessible by the client process.

13. The computer system of claim 11, wherein the providing of the multi-identity security environment comprises constructing, by a component of an operating system of the computing environment, the multi-identity security environment.

14. The computer system of claim 11, wherein the multi-identity security environment is provided in response to the server process initiating creation of the client process.

15. The computer system of claim 11, wherein the method further comprises initiating by the server process the providing of the multi-identity security environment, in response to initiating creation of the client process.

16. The computer system of claim 15, wherein the method further comprises configuring the server process to enable the server process to initiate the providing of the multi-identity security environment.

17. The computer system of claim 16, wherein the configuring comprises using an environment variable to configure, wherein recoding of the server process is unnecessary.

18. The computer system of claim 11, wherein the multi-identity security environment is used by the client process to access a resource accessible to the server process but not accessible to the client process using the user identity of the server process.

19. The computer system of claim 18, wherein the client process uses the user identity in the multi-identity security environment of the client process to access a resource accessible to the client process but not accessible to the server process.

20. The computer system of claim 18, wherein the audit record further specifies the particular events of the access including an indication that the client was allowed to access server accessible resources, since the client process was established through an action of the server process that was authorized to access the resources.

21. A computer program product for managing identities of processes of a computing environment, the computer program product comprising:
  a storage medium readable by a processor and storing instructions for execution by the processor for performing a method comprising:
    initiating by a server process in a server address space creation of a client process in a client address space to service a request from a client, wherein the client process executes the server process;
    providing a multi-identity security environment for the client process, the multi-identity security environment is a nested security environment that includes a user identity of the client process and a user identity of the server process;
    using the multi-identity security environment to determine whether the client has authority to access a protected resource, said using comprising:
      determining whether a user identity is on an access list for the protected resource, wherein the user identity is the user identity of the client process or the user identity of the server process, and wherein another user identity is the other of the user identity of the client process and the user identity of the server process;
      granting the client access to the protected resource via the user identity, in response to the determining indicating the user identity is on the access list;
      deciding, in response to the user identity not being on the access list, whether the another user identity is on the access list;
      granting the client access to the protected resource via the another user identity, in response to the deciding indicating the another user identity is on the access list; and
      providing an audit record, in response to access being granted, that indicates which user identity of the multi-identity security environment for the client process provided access, wherein the audit record indicates whether access was granted via the user identity of the client process or whether access was granted via the user identity of the server process.

22. The computer program product of claim 21, wherein the method further comprises identifying one or more resources accessible by the server process that are to be accessible by the client process.

23. The computer program product of claim 21, wherein the providing of the multi-identity security environment comprises constructing, by a component of an operating system of the computing environment, the multi-identity security environment.

24. The computer program product of claim 21, wherein the multi-identity security environment is provided in response to the server process initiating creation of the client process.

25. The computer program product of claim 21, wherein the method further comprises initiating by the server process the providing of the multi-identity security environment, in response to initiating creation of the client process.

26. The computer program product of claim 25, wherein the method further comprises configuring the server process to enable the server process to initiate the providing of the multi-identity security environment.

27. The computer program product of claim 26, wherein the configuring comprises using an environment variable to configure, wherein recoding of the server process is unnecessary.

28. The computer program product of claim 21, wherein the multi-identity security environment is used by the client process to access a resource accessible to the server process but not accessible to the client process using the user identity of the server process.

29. The computer program product of claim 28, wherein the client process uses the user identity in the multi-identity security environment of the client process to access a resource accessible to the client process but not accessible to the server process.

30. The computer program product of claim 28, wherein the audit record further specifies the particular events of the access including an indication that the client was allowed to access server accessible resources, since the client process was established through an action of the server process that was authorized to access the resources.

* * * * *